United States Patent [19]
Park

[11] Patent Number: 6,075,890
[45] Date of Patent: Jun. 13, 2000

[54] VIDEO-IMAGE HISTOGRAM EQUALIZATION CIRCUIT AND METHOD THEREFOR

[75] Inventor: Se-woong Park, Seoul, Rep. of Korea

[73] Assignee: Samsung Electronics Co., Ltd., Kyungki-Do, Rep. of Korea

[21] Appl. No.: 08/882,261

[22] Filed: Jun. 25, 1997

[30] Foreign Application Priority Data

Jun. 27, 1996 [KR] Rep. of Korea ...................... 96-24413

[51] Int. Cl.[7] .................................................. G06K 9/00
[52] U.S. Cl. ........................................... 382/169; 348/672
[58] Field of Search .................................... 382/168, 169; 348/671, 672, 673, 670; 358/522, 445, 447, 521, 443

[56] References Cited

U.S. PATENT DOCUMENTS 5,388,168  2/1995  Sakashita ................................. 382/169

FOREIGN PATENT DOCUMENTS 342 549  11/1989  European Pat. Off. .
488 542   6/1992  European Pat. Off. .

OTHER PUBLICATIONS

J.C. Russ, The Image Processing Handbook, 2nd ed., CRC Press Inc., pp. 216–224, 1995.

*Primary Examiner*—Phuoc Tran
*Attorney, Agent, or Firm*—Sughrue, Mion, Zinn, Macpeak & Seas, PLLC

[57] ABSTRACT

A histogram equalization circuit includes a calculator and a mapper. The calculator calculates cumulative distribution function (CDF) values for the respective gray levels with respect to an input image corresponding to an area signal of a predetermined period. The mapper maps the input image of a predetermined period to a new gray level based on the CDF values of the respective gray levels. The present invention obtains a CDF value by selecting a field period or a frame period as a CDF calculation area and performs a histogram equalization the image signal of the selected period based on the CDF value. Calculation of the CDF is performed by direct comparison of the pixels of the image, thus eliminating the need to calculate a probability density function for the gray levels. Therefore, it is possible to obtain a high correlation between the input data and the equalized data and to reduce the quantity of hardware.

13 Claims, 5 Drawing Sheets

VIDEO-IMAGE HISTOGRAM EQUALIZATION CIRCUIT AND METHOD THEREFOR

BACKGROUND OF THE INVENTION

1. Field of the Invention

The present invention relates to a histogram equalization circuit based on a cumulative distribution function (CDF) calculation area and a method therefor. More particularly, it relates to a circuit for obtaining a CDF value by selecting a predetermined section of an image as the CDF calculation area and histogram equalizing an image signal of a predetermined period based on the CDF value and a method therefor.

This application for an image histogram equalization circuit and method is based on Korean Patent Application No. 96-24413 which is incorporated by reference herein for all purposes.

2. Related Art

The basic operation of histogram equalization is to convert a given input image based on the histogram of the input image. The histogram of an image is a gray level distribution of the given input image. The histogram provides an entire description of the appearance of the image. A gray level which is appropriately controlled with respect to the given image improves the appearance of the image or a contrast thereof.

Histogram equalization is a method for enhancing the contrast of the given image according to the gray level distribution of the image and is the most widely known among the various methods for enhancing the contrast, such as those described in the following documents: [1] J. S. Lim, "Two-Dimensional Signal and Image Processing," Prentice Hall, Englewood Cliffs, N.J. 1990; and [2] R. C. Gonzalez and P. Wints, "Digital Image Processing," Addison-Wesley, Reading, Mass., 1977.

Useful application of the histogram equalization method, including medical image processing and radar image processing, are described in the following documents: [3] J. Zimmerman, S. Pizer, E. Staab, E. Perry, W. McCartney, and B. Brenton, "Evaluation of the Effectiveness of Adaptive Histogram Equalization For Contrast Enhancement," IEEE Transaction on Medical Imaging, pp. 304–312, Dec. 1988; and [4] Y. Li, W. Wang, and D. Y. Yu, "application of Adaptive Histogram Equalization to X-Ray Chest Image," Proceedings of the SPIE, pp. 513–514, vol. 2321, spring 1994.

Generally, the histogram equalization flattens the gray level distribution of the image, thus enhancing the contrast of the image by enlarging its dynamic range.

Hereinafter, a typical histogram equalization method is simply described.

A given image $\{X\}$ is described by L discrete gray levels $\{X_0, X_1, \ldots, X_{L-1}\}$, where $X_0$ and $X_{L-1}$ denote a black level and a white level, respectively.

A probability density function (PDF) is defined as:

$$p(X_k) = \frac{n_k}{n}, \quad \text{for } k = 0, 1, \ldots, L-1 \qquad (1)$$

Here, $n_k$ denotes the number of times of a gray level $X_k$ appears in image $\{X\}$ and n denotes the total number of samples in image $\{X\}$. At this time, the CDF is defined as follows.

$$c(X_k) = \sum_{j=0}^{k} p(X_j) \qquad (2)$$

An output Y of the typical histogram equalization with respect to the input sample $X_k$ of the given image based on the CDF value is expressed as follows:

$$Y = c(X_k)X_{L-1} \qquad (3)$$

Therefore, by mapping the levels of the input image to new gray levels based on the CDF, picture quality is improved by enhancing the contrast of the entire screen.

FIG. 1A shows an example of the PDF of a specific image. The PDF is the result in which the number of pixels of the respective gray levels is counted, receiving a luminance signal whose brightness is between the minimum gray level "0" and the maximum gray level MAX "100" and the number is divided by the total number of pixels in the image. The input image shown in FIG. 1A is concentrated between a gray level "30" and a gray level "90".

The CDF is obtained using Formula (2) based on the PDF shown in FIG. 1A. The output after performing the histogram equalization using the CDF as a conversion function is expressed by the Formula (3). The PDF of the equalized image is shown in FIG. 1B. Therefore, when the input image, concentrated over the range "30–90" shown in FIG. 1A, is histogram equalized, it is mapped to the gray level "10–100", as shown in FIG. 1B. Thus, the contrast is enhanced and a clear picture is provided.

The quantity of hardware is closely related to how the CDF calculation area is set to obtain the CDF value based on the PDF. Namely, when the CDF value is obtained by summing over many input pixels, the correlation between the input and output images is improved, but the quantity of hardware required increases. Therefore, it is necessary to set up an appropriate CDF calculation area so as to heighten the correlation between the input data and the equalized data and to simplify the hardware.

SUMMARY OF THE INVENTION

It is an object of the present invention to provide a circuit for obtaining a CDF by selecting a predetermined section of an image as a CDF calculation area and histogram-equalizing an image signal of a predetermined period based on the CDF value.

It is another object of the present invention to provide a method for obtaining a CDF by selecting a predetermined section of an image as a CDF calculation section and histogram equalizing an image signal of a predetermined period based on the CDF.

To achieve the first object, there is provided a histogram equalization circuit in which contrast is enhanced by controlling a gray level with respect to an image signal expressed by a level of a predetermined number, the circuit having a calculation means and a mapping means. The calculation means calculates cumulative distribution function (CDF) values for the respective gray levels with respect to an input image corresponding to an area signal of a predetermined period by counting the number of pixels which are not more than the respective gray levels and dividing the counted result by the total number of samples with respect to the input image. The mapping means maps the input image of a predetermined period to a new gray level based on the CDF values of the respective gray levels.

To achieve the second object, there is provided a histogram equalization method for enhancing contrast by controlling a gray level with respect to an image signal expressed by a level of a predetermined number, comprising the steps of (a) calculating and (b) mapping. In the calculating step, cumulative distribution function (CDF) values are calculated for the respective gray levels by counting the number of pixels which are not more than the respective gray levels and dividing the counted result by the total number of samples with respect to the input image corresponding to an area signal of a predetermined period. In the mapping step, the input image of a predetermined period is mapped to a new gray level based on the CDF values of the respective gray levels.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, the preferred embodiments of a histogram equalization circuit based on a CDF calculation area according to the present invention and a method therefor will be described with reference to the attached drawings.

Figure 1A:
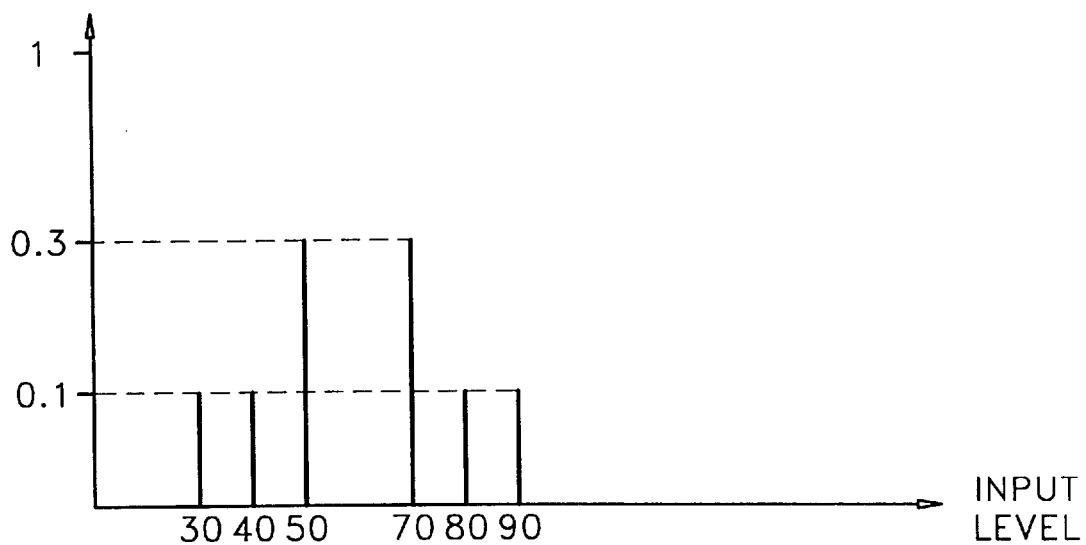
FIG. 1A shows an example of a PDF of a specific image.
Figure 1B:
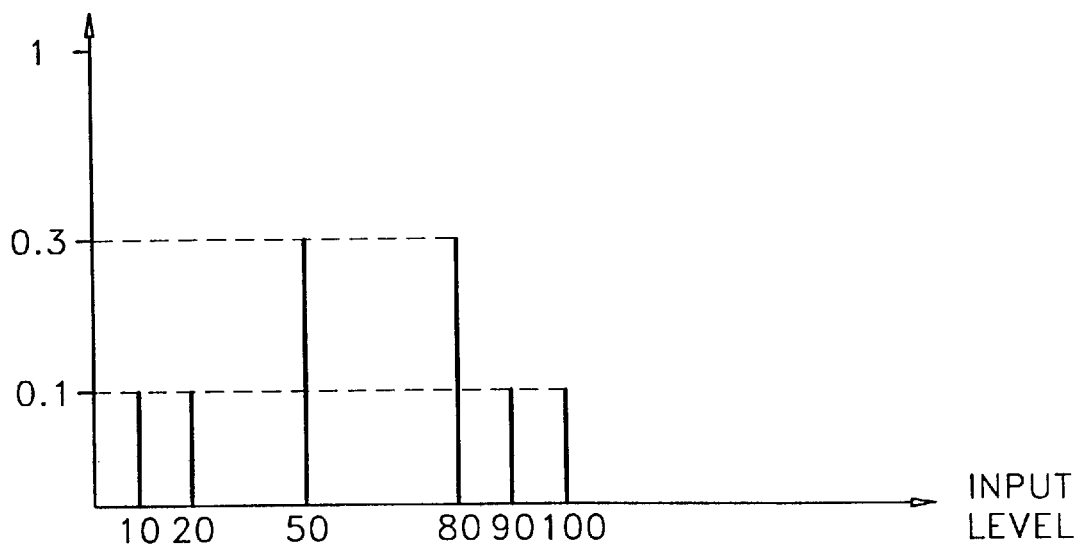
FIG. 1B shows a PDF of an image after performing a histogram equalization based on PDF shown in FIG. 1A.
Figure 2:
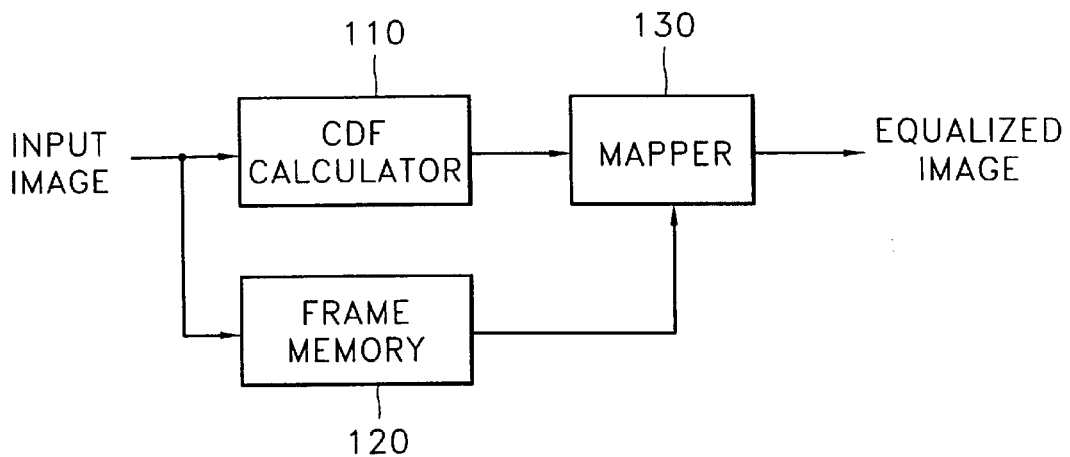
FIG. 2 is a block diagram of an embodiment of a histogram equalization circuit according to the present invention.

In FIG. 2, a CDF calculator 110 directly calculates a CDF value of an input image having a predetermined bit width (for example, 8 bits). Namely, the CDF values of the respective gray levels are obtained by dividing the respective cases in which the gray level=0, the gray level≦1, ..., the gray level≦254, and the gray level≦255 by the total number of samples. In the present invention it is possible to omit the PDF calculator since the CDF is directly calculated from the input pixel.

A frame memory 120 delays the input image by one frame. Here, the input image is delayed by one frame by the frame memory 120 in order to perform the histogram equalization to the frame data itself whose statistical characteristics (CDF value) is obtained in the CDF calculator 110.

A mapper 130 maps the level of the input image to the new gray level according to the CDF value calculated in the CDF calculator 110 corresponding to the level of the input image output through the frame memory 120. Here, the mapper 130 updates the CDF value calculated by the CDF calculator 110 in units of a frame and constructs a look-up-table for reading out the CDF value corresponding to the level of the input image.

Figure 3:
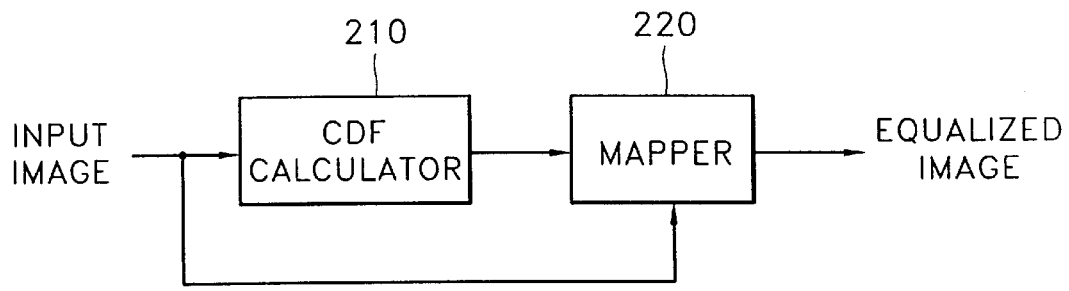
FIG. 3 is a block diagram of another embodiment of a histogram equalization circuit according to the present invention.

FIG. 3 is a block diagram of another embodiment of a histogram equalization circuit according to the present invention, in which the frame memory 120 is omitted. Since the correlation between the previous frame and the present frame is more than 0.95 (95%), the frame memory 120 shown in FIG. 2, which constitutes a large amount of hardware is not used. The CDF obtained from the previous frame is applied to the present frame in the device according to FIG. 3.

Figure 4:
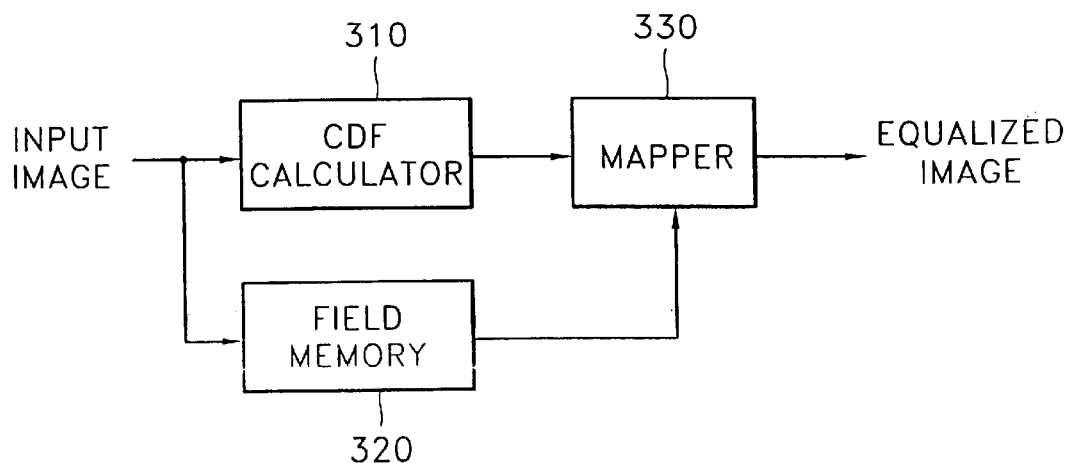
FIG. 4 is a block diagram of still another embodiment of a histogram equalization circuit according to the present invention.

FIG. 4 is a block diagram of still another embodiment of a histogram equalization circuit according to the present invention, which is different from the construction of FIG. 2 in that a field memory 320 is used instead of a frame memory 120.

Figure 5:
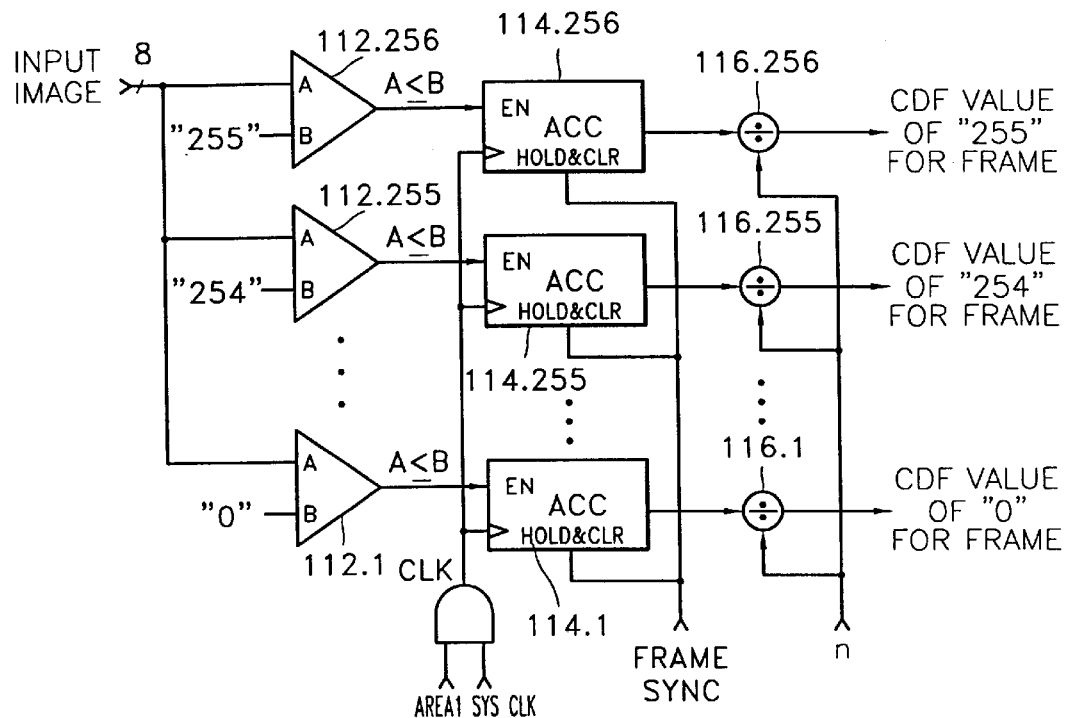
FIG. 5 is a detailed circuit diagram of a CDF calculator used in the circuits shown in FIGS. 2 and 3.

FIG. 5 is a detailed circuit diagram of an embodiment of the CDF calculator 110 which can be used in the circuits shown in FIGS. 2 and 3. Comparators 112.1 to 112.256 compare the level of the input image with the gray levels from "0" to "255". For example, the outputs of the comparators 112.1 to 112.256 become logic "1" when a pixel with gray level less than "255" is input, the outputs of the comparators 112.1 to 112.128 become logic "1" when a pixel with gray level less than "127" is input, and the output of the comparator 112.1 becomes logic "1" when the pixel with gray level of "0" is input.

In case the output of the comparators 112.1 to 112.256 input to the enable port EN according to the clock signal CLK is "1", the accumulators (AC) 114.1 to 114.256 increase their accumulated values by one. The accumulated value is output and the accumulated value is cleared to "0" when a frame synchronizing signal FRAME SYNC is input to the hold and clear ports (HOLD & CLR) of the ACCs. For example, the signal output from the accumulator 114.256 is the number of pixels in a frame with gray levels not more than "255", the signal output from the accumulator 114.128 is the number of pixels in a frame with gray levels not more than "127", and the signal output from the accumulator 114.1 is the number of pixels in a frame having the level "0". When the dividers 116.1 to 116.256 divide the outputs of the accumulators 114.1 to 114.256 by the total number of samples per frame "n", the CDF values of gray levels from "0" to "255" are output.

A clock signal CLK input to the accumulators 114.1 to 114.256 is the output of AND gate G1 obtained by performing an AND operation of the system clock signal SYS CLK and the area signal AREA1, which is active during the frame period representing the CDF calculation area. Namely, only when the first area signal AREA1 is "high", the outputs of the comparators 112.1 to 112.256 are accumulated in the accumulators 114.1 to 114.256.

Here, the respective accumulators 114.1 to 114.256 include a counter for counting the outputs of their respective comparators 112.1 to 112.256 only when they become logic "1" according to the clock signal CLK, and clearing them according to the frame synchronizing signal FRAME SYNC. The clock signal CLK is obtained by performing an AND operation with respect to the first area signal AREA1 and the system clock signal SYS CLK. The respective accumulators 114.1 to 114.256 also include a latch for inputting the frame synchronizing signal FRAME SYNC as a hold signal, latching the output of the counter, and outputting the latched output to the respective accumulators 116.1 to 116.256 according to the frame synchronizing signal FRAME SYNC. Here, the complexity of hardware as large as the number of samples is increased by the counter operated according to the histogram equalization period of the area signal showing the CDF calculation period.

Figure 6:
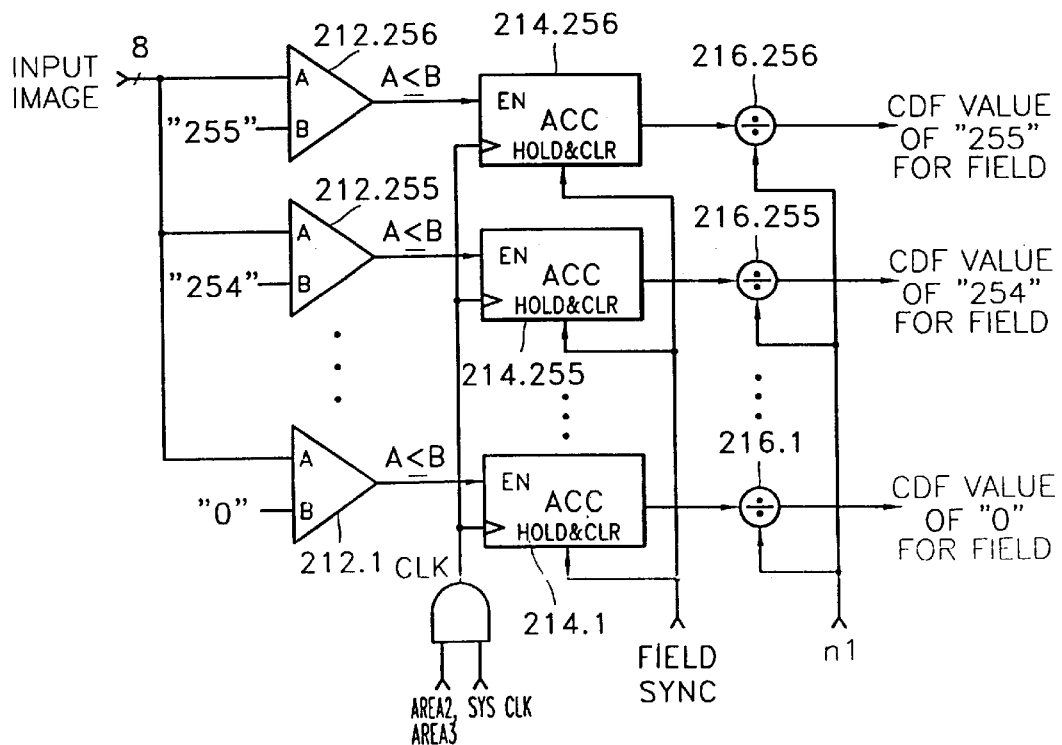
FIG. 6 is a detailed circuit diagram of another embodiment of a CDF calculator used in the circuits shown in FIGS. 2 and 4.

FIG. 6 is a detailed circuit diagram of another embodiment of the CDF calculator which can be used in the histogram equalization circuit shown in FIGS. 2 to 4.

When the CDF calculator shown in FIG. 6 is used in the histogram equalization circuit shown in FIGS. 2 and 3, a second area signal AREA2 having only one of two fields constituting one frame as the CDF calculation area is used. The outputs of the comparators 212.1 to 212.256 accumulated according to the field synchronizing signal FIELD SYNC are output to the respective dividers 216.1 to 216.256 in the respective accumulators 214.1 to 214.256. The CDF values whose gray levels per a field are from "0" to "255" are output by dividing the outputs of the respective accumulators 214.1 to 214.256 by "n1", the total number of samples per field in the respective dividers 216.1 to 216.256.

When the CDF calculator shown in FIG. 6 is used in the histogram equalization circuit shown in FIG. 4, a third area signal AREA3 equates every field period to the CDF calculation area. The outputs of the respective comparators 212.1 to 212.256 accumulated according to the field synchronizing signal FIELD SYNC are output to the respective dividers 216.1 to 216.256 in the respective accumulators 214.1 to 214.256. The CDF values whose gray levels per a field are from "0" to "255" by dividing the outputs of the respective accumulators 214.1 to 214.256 by the number "n1" of the entire samples in the respective dividers 216.1 to 216.256.

Figure 7:
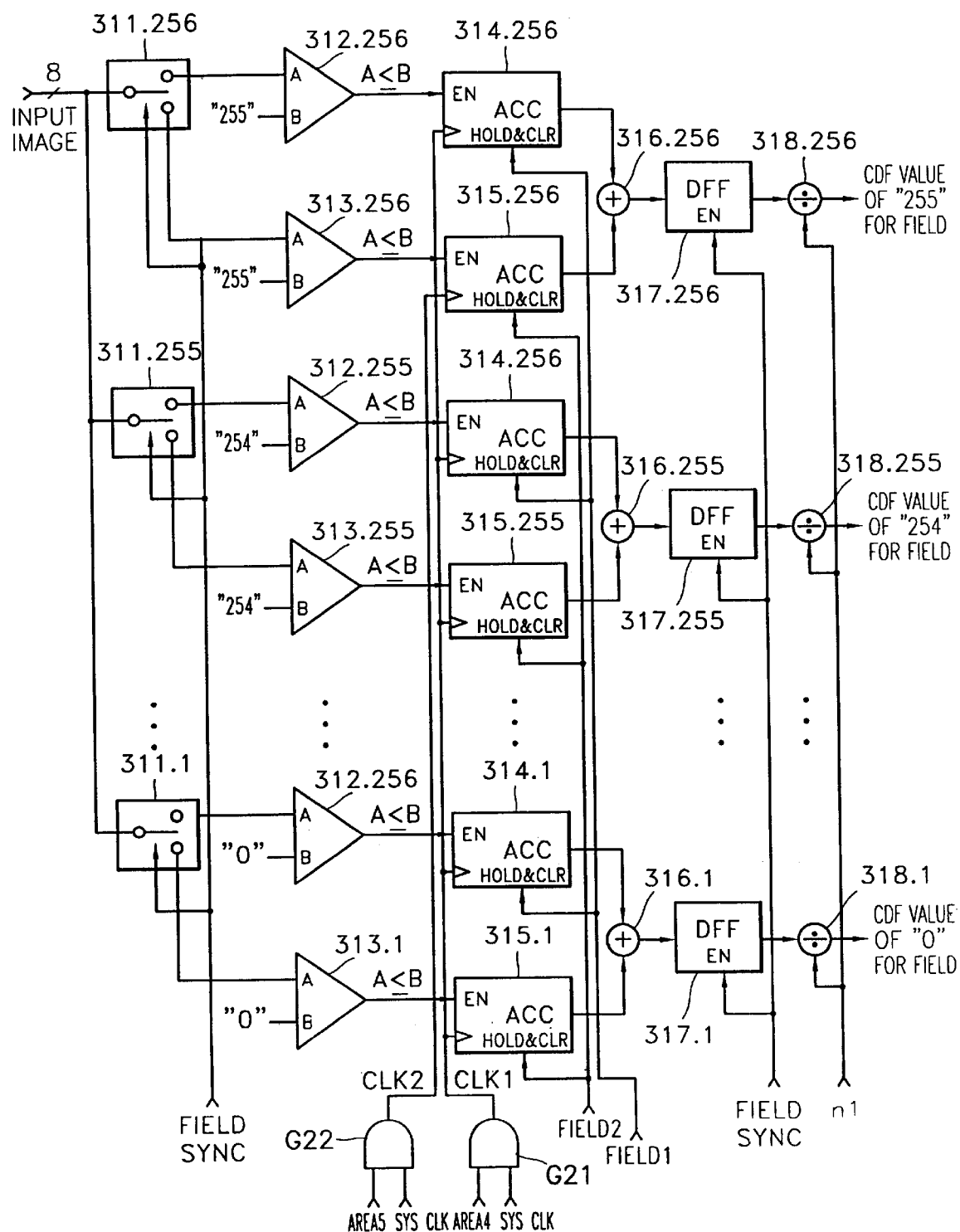
FIG. 7 is a detailed circuit diagram of still another embodiment of a CDF calculator used in the circuit shown in FIG. 4.

FIG. 7 is a detailed circuit diagram of still another embodiment of the CDF calculator which can be used in the histogram equalization circuit shown in FIG. 4.

In FIG. 7, the respective switches 311.1 to 311.256 select the input image of the first field (which is referred to as "an odd field" hereinafter) of two fields constituting one frame based on the field synchronizing signal FIELD SYNC and input it to the first input ports "A" of the comparators 312.1 to 312.256. They also select the input image of the second field (which is referred to as "an even field" hereinafter) and input it to the first input ports "A" of the comparators 313.1 to 313.256. Here, the respective switches can be constructed by a demultiplexer.

The respective comparators 312.1 to 312.256 and the respective comparators 313.1 to 313.256 compare the level of the input image switched by the switches with the respective gray levels.

The accumulators 314.1 to 314.256 increase the outputs of the respective comparators 312.1 to 312.256 input to an enable port EN according to a clock signal CLK1 by one when they are logic "1", output the accumulated value when a control signal FIELD1 representing the odd field is input to the hold and clear port HOLD&CLR, and clear the accumulated value to "0". Also, the respective accumulators 315.1 to 315.256 increase the outputs of the respective comparators 313.1 to 313.256 input to the enable port EN according to a clock signal CLK2 by one when they are logic "1", output the accumulated value when a control signal FIELD 2 representing the even field is input to the hold and clear port HOLD&CLR, and clear the accumulated value to "1".

The adders 316.1 to 316.256 add the outputs of the accumulators 314.1 to 314.256 to the outputs of the accumulators 315.1 to 315.256 and output them to D flip-flops (DFF) 317.1 to 317.256. The outputs of the D flip-flops are output to the dividers 318.1 to 318.256 based on the field synchronizing signal FIELD SYNC. The dividers divide the outputs of the D flip-flops by "n1" the total number of samples per field and output the CDF values of the respective gray levels for the field.

The clock signal CLK1 input to the respective accumulators 314.1 to 314.256 is obtained by performing an AND operation with respect to the system clock SYS CLK and a fourth area signal AREA4 showing the CDF calculation area of the odd field period in an AND gate G21. The clock signal CLK2 input to the respective accumulators 315.1 to 315.256 is obtained by performing an AND operation with respect to the system clock SYS CLK and a fifth area signal AREA5 showing the CDF calculation area of the even field period in an AND gate G22.

Therefore, the CDF calculator shown in FIG. 7 is used in mapping the image signal of the mth field to a new level based on the CDF value obtained by adding the CDF value of the (m−1)th field to the CDF value of mth field.

Selecting the range of the CDF calculation area so as to create a high correlation between the input data and the mapped data and to simplify the hardware is an important aspect of the present invention.

Figure 8:
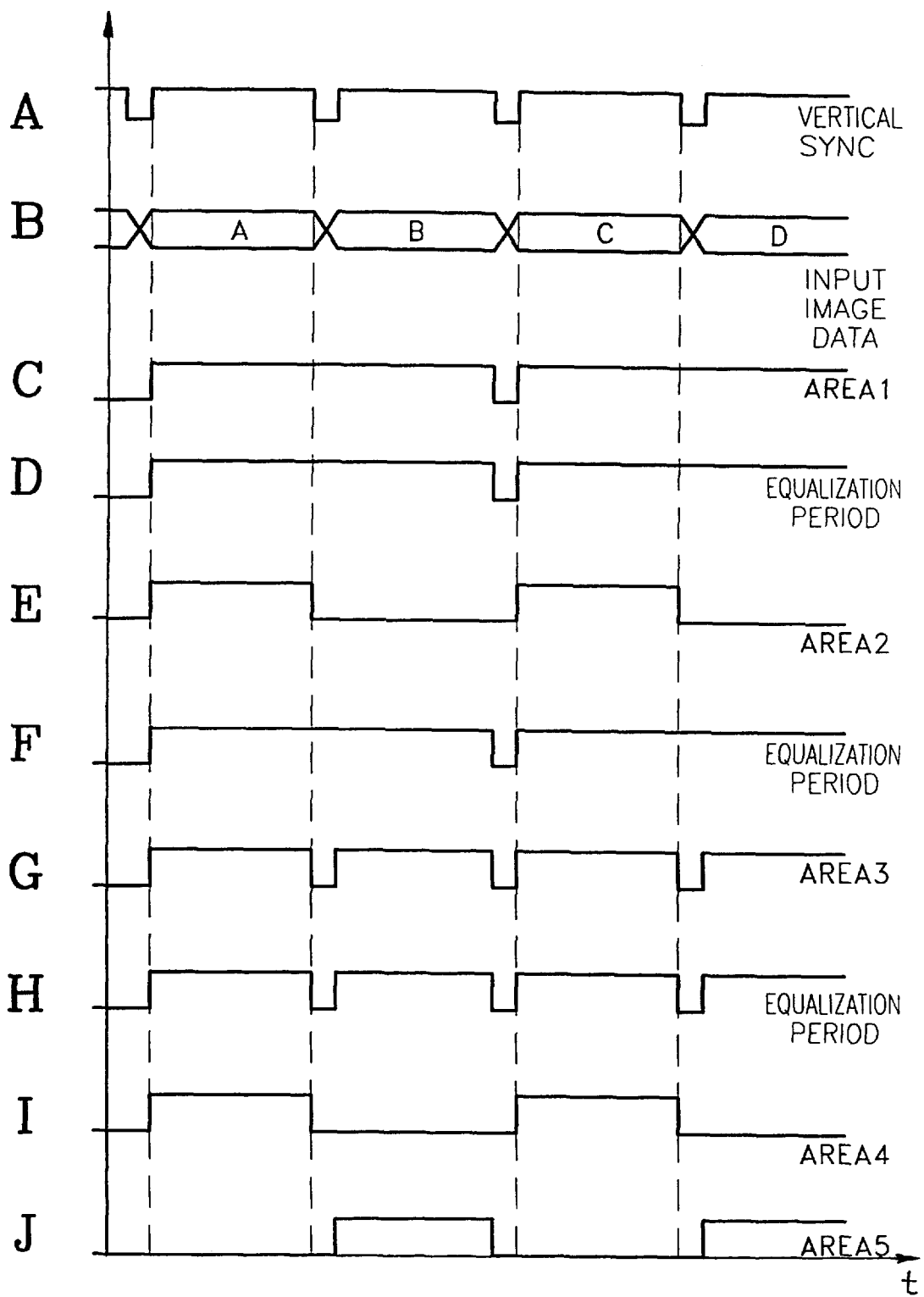
FIG. 8 is a waveform timing diagram showing waveforms A through J, including area signals used in the present invention and a histogram equalization period.

FIG. 8 is a waveform timing diagram showing signal waveforms A through J used in the present invention and a histogram equalization period.

Waveform A of FIG. 8 shows a vertical synchronizing signal. Waveform B of FIG. 8 shows input image data which is synchronized by the vertical synchronizing signal. Waveform C of FIG. 8 shows a first area signal AREA1 for using one frame period as the CDF calculation area. Waveform D of FIG. 8 shows a histogram equalization period for obtaining the CDF value during one frame using the first area signal AREA 1 shown in waveform C and mapping the image signal of one frame to a new gray level based on the obtained CDF value.

Here, the first area signal AREA1 is input to the AND gate G1 of the CDF calculator shown in FIG. 5, the CDF calculator of FIG. 5 maps the image signal of the present frame to a new gray level based on the CDF value of the present frame or maps the image signal of the present frame to a new gray level based on the CDF value of the previous frame by being applied to the histogram equalization circuit shown in FIGS. 2 or 3.

Waveform E of FIG. 8 shows the second area signal AREA2 with the CDF calculation area during one field in one frame. Waveform F of FIG. 8 shows a histogram equalization period for obtaining the CDF value during one field according to the second area signal AREA2 shown in waveform E and mapping the image signal of one frame to a new gray level based on the obtained CDF value.

The second area signal AREA2 is input to the AND gate G12 of the CDF calculator shown in FIG. 6. The CDF calculator of FIG. 6 maps the image signal of one frame to a new gray level based on the CDF value during one field or maps the image signal of the present frame to a new gray level based on the CDF value during one field of the previous frame by being applied to the histogram equalization circuit shown in FIGS. 2 or 3.

Waveform G of FIG. 8 shows a third area signal AREA3 having the CDF calculation area during every field. Waveform H of FIG. 8 shows a histogram equalization period for obtaining the CDF value of every field according to the third area signal AREA3 shown in waveform G and mapping the image signal of every field to a new gray level based on the obtained CDF value.

The third area signal AREA3 is input to the AND gate G12 of the CDF calculator shown in FIG. 6. The CDF calculator of FIG. 6 maps the image signal of every field to a new gray level based on the CDF value obtained in every field by being applied to the histogram equalization circuit shown in FIG. 4.

The inner construction of the counter of the respective accumulators is simplified in the histogram equalization performed by calculating the CDF value in units of a field using the second area signal or the third area signal (AREA2 or AREA3) shown in waveforms E or G compared with the histogram equalization performed by calculating the CDF value in units of a frame using the first area signal (AREA1) shown in waveform C. Thus, the quantity of the hardware is reduced.

Waveforms I and J in FIG. 8 show a fourth area signal (AREA4) and a fifth area signal (AREA5), respectively. The fourth area signal and the fifth area signal (AREA4 and AREA5) are respectively input to the AND gates (G21 and G22) of the CDF calculator shown in FIG. 7. The CDF calculator of FIG. 7 is applied to the histogram equalization circuit shown in FIG. 4.

Namely, a field image of a B section is mapped to a new gray level using a result obtained by adding the CDF value of the A section shown in waveform B obtained using the fourth area signal (AREA4) shown in waveform I to the CDF value of the B section shown in waveform B obtained using the fifth area signal AREA5 shown in waveform J. A field image of a C section is mapped to a new gray level using a result obtained by adding the CDF value of the B section to that of the C section.

The CDF calculator shown in FIGS. 5, 6, and 7 is constructed to calculate the respective CDF values of the total gray levels, however, can be constructed to calculate the CDF value of the gray level of a predetermined number which is smaller than the total gray levels in order to simplify hardware. At this time, a CDF interpolator is provided in the rear end of the CDF calculator.

As mentioned above, it is possible to heighten the correlation between the input data and the equalized data and to reduce the quantity of the hardware by histogram equalizing the image signal of the field or the frame period based on the CDF value obtained by selecting the field or the frame period as the CDF calculation area.

Although the invention has been described in terms of several preferred embodiments, it will be understood that various changes and modifications may be made to the described embodiments without departing from the spirit and scope of the invention.

What is claimed is:

1. A histogram equalization circuit for enhancing contrast by controlling gray level dynamic range with respect to an input image signal expressed by a predetermined number of gray levels, said histogram equalization circuit comprising:
    calculation means for calculating cumulative distribution function (CDF) values for the respective gray levels with respect to the input image signal, corresponding to an area signal of a predetermined period, by counting the number of pixels having values which are not more than the respective gray levels and dividing the counted result by the total number of samples in the input image; and mapping means for mapping the input image signal to a new gray level based on the CDF values of said respective gray levels;

wherein said calculation means comprises:
    a plurality of comparators for comparing the values of the input image signal with the respective gray levels;
    a plurality of accumulators for accumulating the respective outputs of said plurality of comparators according to said area signal and outputting the number of pixels which have values not more than the respective gray levels; and
    a plurality of dividers for dividing the respective outputs of said plurality of accumulators by the total number of samples with respect to said input image of the predetermined period and outputting the divided results as CDF values of the respective gray levels.

2. The histogram equalization circuit as claimed in claim 1, wherein said area signal of the predetermined period is the CDF calculation area of a frame period.

3. The histogram equalization circuit as claimed in claim 2, wherein said input image signal of the predetermined period is the frame image.

4. The histogram equalization circuit as claimed in claim 1, wherein said area signal of the predetermined period is the CDF calculation area of a field period.

5. The histogram equalization circuit as claimed in claim 4, wherein said input image of the predetermined period is the frame image.

6. A histogram equalization circuit for enhancing contrast by controlling gray level dynamic range with respect to an input image signal expressed by a predetermined number of gray levels, said histogram equalization circuit comprising:
    calculation means for calculating cumulative distribution function (CDF) values for the respective gray levels with respect to the input image signal, corresponding to an area signal of a predetermined period, by counting the number of pixels having values which are not more than the respective gray levels and dividing the counted result by the total number of samples in the input image;
    mapping means for mapping the input image signal to a new gray level based on the CDF values of said respective gray levels; and
    a field memory for delaying said input image signal by one field;
    wherein said calculation means comprises:
    a plurality of comparators for comparing the values of the input image signal with the respective gray levels;
    a plurality of accumulators for accumulating the respective outputs of said plurality of comparators according to said area signal and outputting the number of pixels having values not more than the respective gray levels; and
    a plurality of dividers for dividing the respective outputs of said plurality of accumulators by the total number of samples of said input image of said predetermined period and outputting the divided results as CDF values of the respective gray levels.

7. The histogram equalization circuit as claimed in claim 6, wherein said area signal of the predetermined period is the CDF calculation area of a field period.

8. The histogram equalization circuit as claimed in claim 7, wherein said input image signal of the predetermined period is the field image.

9. A histogram equalization circuit for enhancing contrast by controlling gray level dynamic range with respect to an input image signal expressed by a predetermined number of gray levels, said histogram equalization circuit comprising:

calculation means for calculating cumulative distribution function (CDF) values for the respective gray levels with respect to the input image signal, corresponding to an area signal of a predetermined period, by counting the number of pixels having values which are not more than the respective gray levels and dividing the counted result by the total number of samples in the input image;

mapping means for mapping the input image signal to a new gray level based on the CDF values of said respective gray levels; and a field memory for delaying said input image signal by one field;

wherein said calculation means comprises:

selecting means for selecting one of the input image signal corresponding to an odd field and the input image signal corresponding to an even field according to a field synchronizing signal;

first comparing means comprised of a plurality of comparators for comparing the values of the input image signal corresponding to the odd field selected by said selecting means with the respective gray levels;

second comparing means comprised of a plurality of comparators for comparing the values of the input image signal corresponding to the even field selected by said selecting means with the respective gray levels;

first accumulating means comprised of a plurality of accumulators for accumulating the output of said first comparing means according to a first area signal and outputting the number of pixels having values not ore than the respective gray levels;

second accumulating means comprised of a plurality of accumulators for accumulating the output of said second comparing means according to a second area signal and outputting the number of pixels having values not more than the respective gray levels;

adding means comprised of a plurality of adders for adding the outputs of the respective accumulators of said first accumulating means to the outputs of the respective accumulators of said second accumulating means, respectively;

latching means comprised of a plurality of latches for latching the respective outputs of said plurality of adders and outputting the latched signal according to said field synchronizing signal; and dividing means comprised of a plurality of dividers for dividing the respective outputs of said plurality of latches by the total number of samples of the input image of the predetermined period and outputting the divided results as CDF values of the respective gray levels.

10. The histogram equalization circuit as claimed in claim 9, wherein said first area signal represents the CDF calculation area of the odd field period and said second area signal represents the CDF calculation area of the even field period.

11. The histogram equalization circuit as claimed in claim 10, wherein said calculation means outputs the CDF value obtained by adding the CDF value of an (m−1)th field to the CDF value of an mth field, said mapping means maps the image signal of said mth field to a new level based on said added CDF value, and m is a predetermined number.

12. A histogram equalization method for enhancing contrast by controlling a gray level with respect to an input image signal expressed by a predetermined number of gray levels, comprising the steps of:

(a) calculating cumulative distribution function (CDF) values for the respective gray levels by counting the number of pixels in the image signal having values which are not more than the respective gray levels and dividing the counted result by the total number of samples with respect to the input image corresponding to an area signal of a predetermined period; and (b) mapping the input image signal of a predetermined period to a new gray level based on the CDF values of the respective gray levels;

wherein said area signal of the predetermined period is the CDF calculation area of a field period; and wherein in said step (a), the CDF value obtained by adding the CDF value of an (m−1)th field to the CDF value of an mth field is output, and m is a predetermined number.

13. The histogram equalization method as claimed in claim 12, wherein in said step (b), the image signal of said mth field is mapped to a new gray level based on the added CDF value.

* * * * *